(12) United States Patent
Vining et al.

(10) Patent No.: US 10,423,137 B2
(45) Date of Patent: Sep. 24, 2019

(54) SCADA SENSOR GATEWAY

(71) Applicant: SIM Electronics, LLC, Trussville, AL (US)

(72) Inventors: Bruce Edward Vining, Springville, AL (US); Samuel Lyman Siegel, Birmingham, AL (US); Austin Green, Birmingham, AL (US); Steven Puckett, Pinson, AL (US)

(73) Assignee: SIM ELECTRONICS, LLC, Trussville, AL (US)

( * ) Notice: Subject to any disclaimer, the term of this patent is extended or adjusted under 35 U.S.C. 154(b) by 121 days.

(21) Appl. No.: 15/411,626

(22) Filed: Jan. 20, 2017

(65) Prior Publication Data

US 2017/0205789 A1    Jul. 20, 2017

Related U.S. Application Data

(60) Provisional application No. 62/280,872, filed on Jan. 20, 2016, provisional application No. 62/343,595, filed on May 31, 2016.

(51) Int. Cl.
  *G05B 19/042* (2006.01)

(52) U.S. Cl.
  CPC .. *G05B 19/042* (2013.01); *G05B 2219/24215* (2013.01)

(58) Field of Classification Search
  CPC .... G05B 19/042; G05B 19/04; G05B 19/048; G05B 19/05; G05B 2219/24215; G05B 2219/24216; G06F 15/46; G01R 7/00; H04J 3/22; G01W 1/10
  USPC ............ 340/870.01, 870.02, 870.09, 870.11, 340/870.14; 324/142, 483; 370/79, 85.8, 370/95.2
  See application file for complete search history.

(56) References Cited

U.S. PATENT DOCUMENTS

| | | | | |
|---|---|---|---|---|
| 5,490,134 A | * | 2/1996 | Fernandes | H04L 29/06 340/3.1 |
| 5,831,428 A | * | 11/1998 | Pyle | G01R 21/133 324/142 |
| 2014/0324351 A1 | * | 10/2014 | Dannevik | G01W 1/10 702/3 |
| 2016/0169949 A1 | * | 6/2016 | Hatchett | G06F 3/04817 702/62 |

* cited by examiner

*Primary Examiner* — Hung T Nguyen
(74) *Attorney, Agent, or Firm* — Butler Snow LLP

(57) ABSTRACT

Devices that transfer and communicate tap dial position changes to a remote location are bulky, cost prohibitive, and electronically noisy. A method and device for providing real-time readings of data from remote utility substation equipment, digitizing respective real-time information, and transmitting said digitized data over a utility provider's secure network to an operations control center, thus making said critical field data immediately available to a utility Operations Control Center and significantly reducing field manpower resources required to monitor critical operational data.

4 Claims, 5 Drawing Sheets

SCADA SENSOR GATEWAY

CROSS-REFERENCE TO RELATED APPLICATIONS

This application claims the benefit of U.S. Provisional Application No. 62/280,872 filed Jan. 20, 2016, and U.S. Provisional Application 62/343,595 filed May 31, 2016, which are incorporated herein by reference in their entirety.

FIELD OF THE INVENTION

The present invention is generally directed toward a method and device for remotely displaying, synthesizing and transmitting utility data over a secure supervisory control and data acquisition (SCADA) network.

BACKGROUND OF THE INVENTION

Remote power substations, owned by the utility power companies, are monitored and managed via redundant Operations Control Centers (OCC), located in the coverage region of the utility power companies. Power distribution equipment installed at these remote power substations often provide built-in digitized monitoring subsystems that connect to the utility power company's secure supervisory control and data acquisition (SCADA) network to communicate critical data back to the OCCs. However, in some cases, either the original equipment manufacturers neglect to provide the built-in monitoring capability, for their power distribution equipment, at the remote sites or the equipment is so old that the digitized monitoring technology was not available at the time of equipment manufacture.

In either of those cases, the power distribution equipment's operational monitoring data can only be collected via manual reading of display dials physically mounted on the Original Equipment Manufacturer (OEM) equipment (in our specific case—the current position of a tap dial for a switchable power transformer), on location, at the remote power substations. This approach requires significant manpower resources, deployed in the field, to monitor and collect this critical operational data to be relayed back to the OCC.

Prior art addresses the problem of remotely reading a dial through the use of cameras and light sensors. These solutions are either physically large and/or bulky, which makes them unusable for small dials or tight spaces. The miniaturization of electronics over the past decade means these technologies could be made to work in smaller spaces, though the light sensor solution would be very difficult to set up in a small space (requiring a sensor on the dial and light emitters at each potential position of the dial) and the camera solution would be prohibitively expensive.

Very small IC tilt/angular offset sensors do exist, but they rely on the changing position of the sensor in a static magnetic field, which means there are environments (again, the example of the switchable transformer, which creates a strong moving magnetic field in its general vicinity) which are too electronically noisy for the efficient use of such a device.

SUMMARY OF THE INVENTION

Devices that transfer and communicate tap dial position changes to a remote location are bulky, cost prohibitive, and electronically noisy. The presently disclosed invention is a method and device comprising an accelerometer, tap dial, microcontroller embedded with two complementary software manager subsystems, sensor and protocol software libraries, that provide real-time readings from power distribution equipment, then digitize the respective real-time information, and finally transmit said digitized data over the utility provider's SCADA network, to the OCC. This approach makes the critical field data immediately available at the utility's OCC, thus significantly reducing field manpower resources required to monitor critical operational data

BRIEF DESCRIPTION OF THE DRAWINGS

Further advantages of the invention will become apparent by reference to the detailed description of preferred embodiments when considered in conjunction with the drawings.

DETAILED DESCRIPTION

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

Currently, utility transformer monitoring data can only be collected via manual reading of display dials physically mounted on the OEM equipment on location, at the remote power substations. This approach requires significant manpower resources, deployed in the field, to monitor and collect this critical operational data to be relayed back to the OCC. The disclosed device eliminates the requirement for physically present workmen and increases the amount of data obtained by remotely obtaining utility data, which is then synthetized and communicated to utility company furnished equipment.

The present invention is a device and method for transferring tap dial position changes, in real-time, to a software component capable of communicating to externally connected power utility company SCADA hardware. The device consists of an accelerometer, tap dial, microcontroller embedded with two complementary software manager subsystems, asensor and protocol software libraries, which exchange data for transmission to customer furnished SCADA equipment.

More specifically, a commercial off-the-shelf microcontroller is embedded with a Sensor Manager subsystem and distributed network protocol (DNP3) manager subsystem.

The Sensor Manager subsystem is custom sensor software library used to access and control a commercial off-the-shelf accelerometer mounted to a tap dial, and the DNP3 manager system is a customized commercial off-the-shelf DNP3-compliant communications protocol software library. The Sensor Manager subsystem is coupled with DNP3 Manager subsystem to allow exchange of data between the two subsystems for final data transmission to the customer furnished SCADA equipment.

Figure 1:
FIG. 1 depicts a top plan view of the accelerometer sensor of the device.
Figure 2:
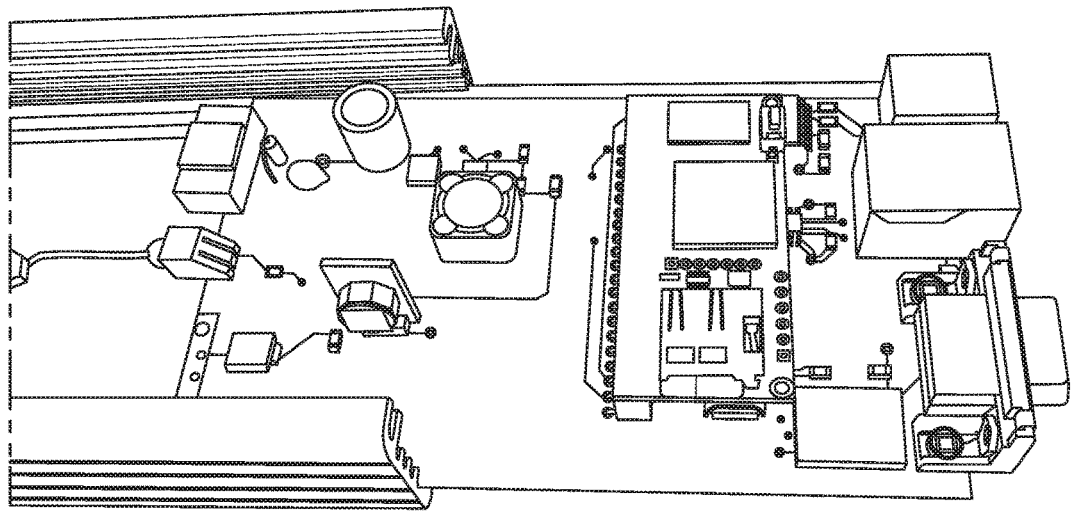
FIG. 2 depicts a top plan view of the processor module of the device.

The digitized data from the accelerometer shown in FIG. 1 is low-pass filtered to ensure that only acceleration due to gravity is included in any calculations. As shown in FIG. 2, a microprocessor (physically separated from the sensor) stores and analyzes the data from the accelerometer, which is then available for transmission over the SCADA network.

Figure 3:
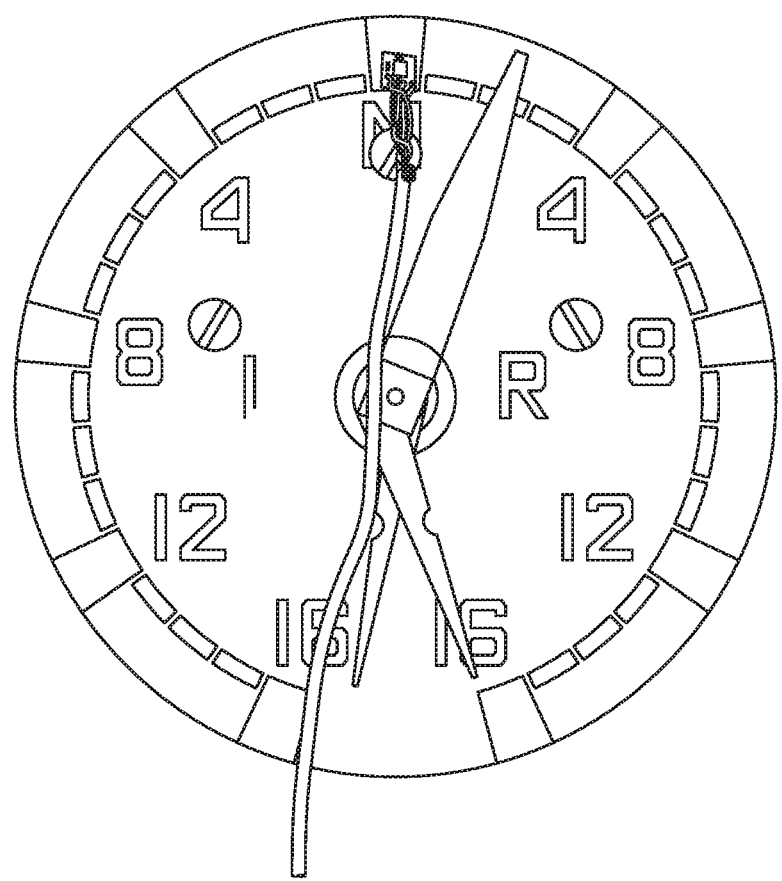
FIG. 3 depicts a top plan view of the accelerometer sensor of the device in neutral/center position on a tap dial.
Figure 4:
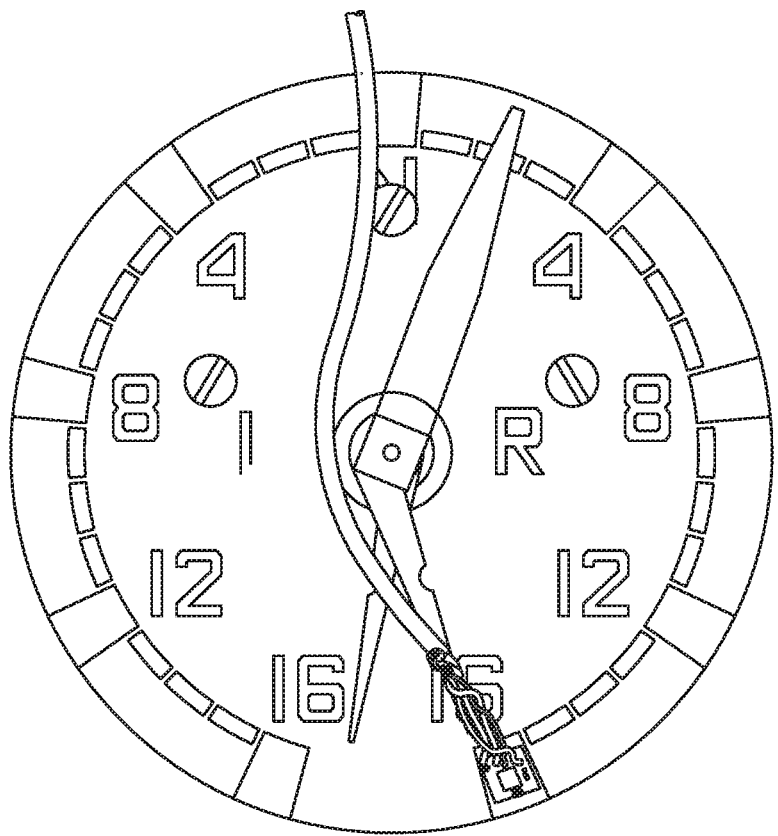
FIG. 4 depicts a top plan view of the accelerometer sensor of the device in MAX position on a tap dial.
Figure 5:
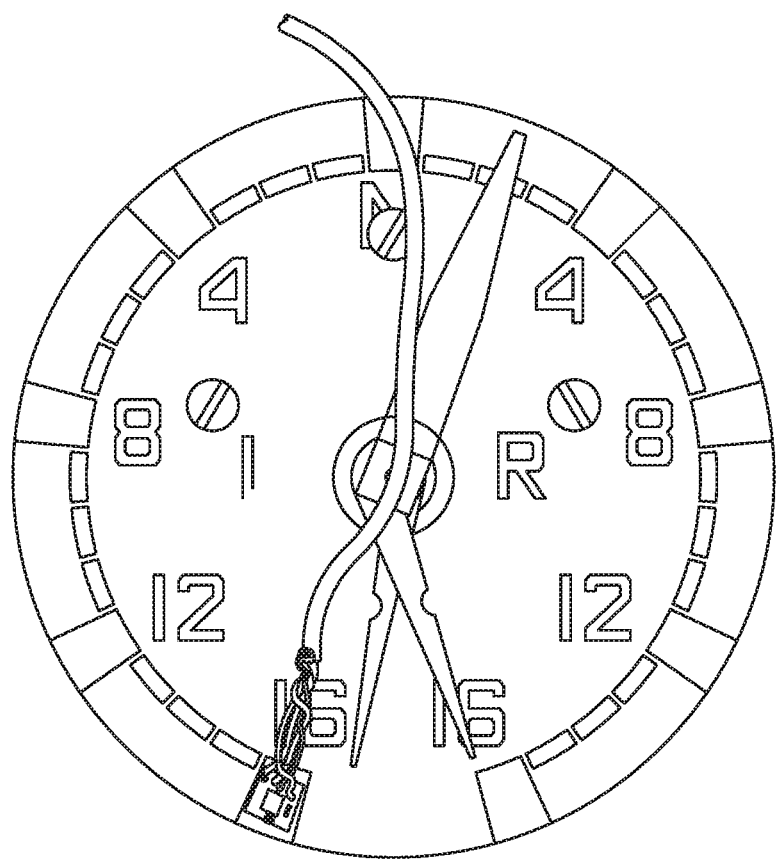
FIG. 5 depicts a top plan view of the accelerometer sensor of the device in MIN position on a tap dial.
Figure 6:
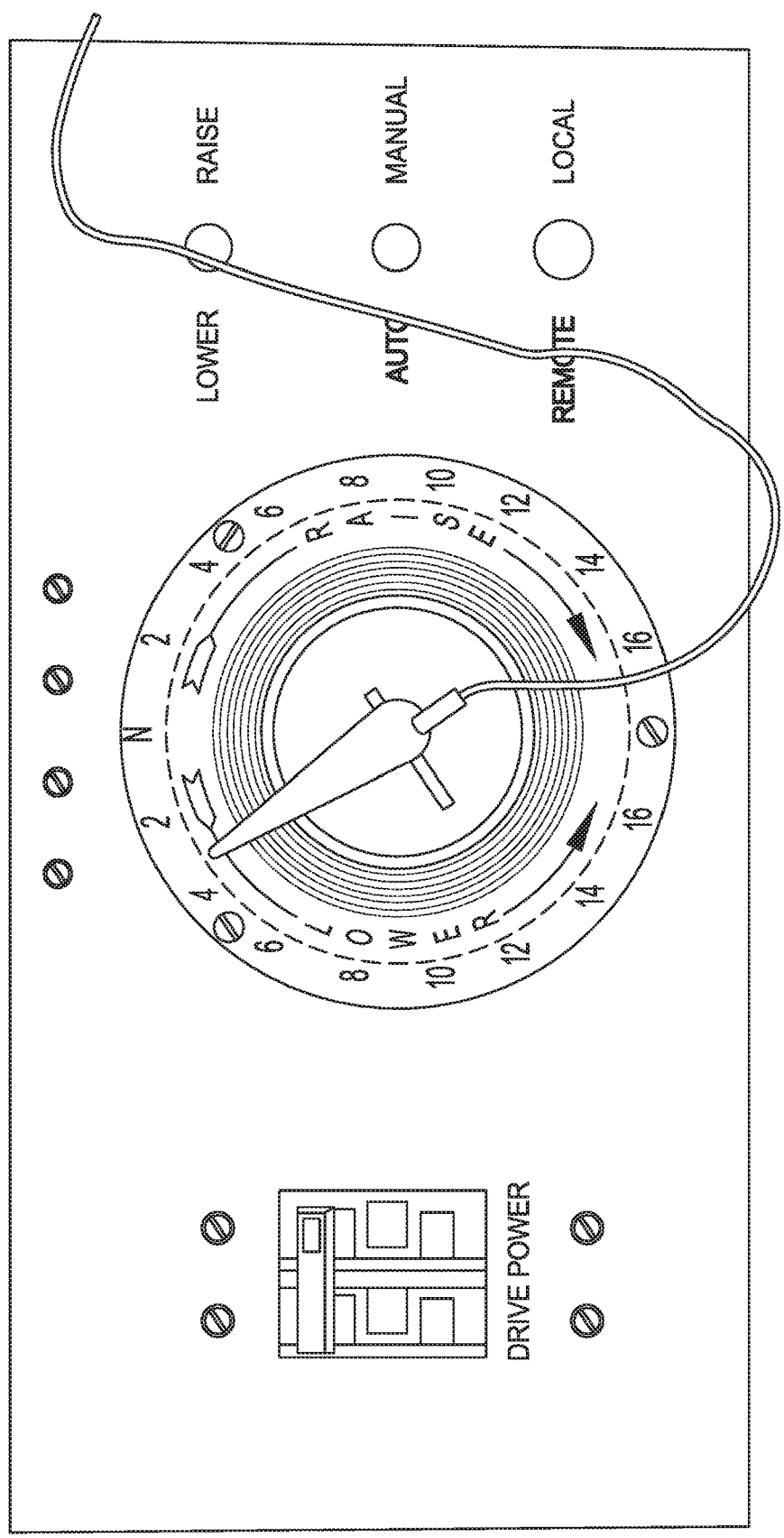
FIG. 6 depicts a top plan view of the system.

The small size of the sensor unit allows it to be positioned by the user for accurate readings of a dial position. For instance, the accelerometer (before permanent mounting) is held in three positions by the user. As shown in FIG. 3, the accelerometer is first held in a neutral (or the center of the dial's travel) position before mounting. Next, as shown in FIG. 4, the accelerometer is held in a MAX position (the furthest the dial will rotate in the clockwise direction). Finally, as shown in FIG. 5, the accelerometer is held in a MIN position (the furthest the dial will rotate in the counter clockwise direction). At each of these three positions, a measurement of the magnitude and direction of acceleration being exerted on each of the three axes is taken, and these (baseline) values are stored. The accelerometer is then mounted to the dial, as shown in FIG. 6, such that, when the dial points to the neutral position, the accelerometer is oriented in the same way that it was when the neutral baseline position was recorded.

Potential embodiments of the device include integrated the Sensor Manager Subsystem directly into the dial that would otherwise be retroactively fitted with the device including automated placement of the accelerometer on the tap dial and performing the processing with the already-on-board SCADA communication processors.

From this point, any three-axis measurement from the accelerometer is considered a three-dimensional vector, and is compared to the baseline measurement using the following formula:

$$\alpha = \cos^{-1} \frac{A_x B_x + A_y B_y + A_z B_z}{\sqrt{A_x^2 + A_y^2 + A_z^2} \sqrt{B_x^2 + B_y^2 + B_z^2}},$$

Where $A_n$ represents the measured acceleration in the baseline measurement for each axis, $B_n$ represents the measured acceleration in the current measurement for each axis, and $\alpha$ represents the magnitude of the angular difference between vectors A and B.

Analysis of the direction of acceleration indicates whether the angular offset (from the neutral baseline position) is positive or negative, and comparison of the currently measured angular offset with the angular offset given by applying the above formula to the neutral/max and neutral/min pairs allows the data to be formatted to fit the dial readings. For example, most switchable transformers used in the power industry have a neutral position, along with 16 positive and 16 negative going taps—each of which are represented on the dial by equally spaced segments. Analyzing current position angular offset as a fraction of maximum angular offset makes the current position easily expressible as one of the tap positions.

Because the dial only rotates in a single plane, so long as the baseline measurement is taken in that same plane, angular offset calculations can be made to be very accurate, and will work even when the face of the dial is not oriented parallel to the direction of gravitational pull. Because the detection device doesn't rely on measuring the changes in a stationary magnetic field (as with IC tilt sensors), the system can be installed in magnetically noisy environments (the dials on a large transformer). Because the solution relies on a single, inexpensive component (which itself requires minimal local external circuitry), it can be installed cheaply and easily in environments where prior art solutions would be prohibitively bulky or costly. The detection system can be made so small that it could even be manufactured directly into the dials themselves, and integrated into the manufacturer-included peripherals.

In the preferred embodiment, an Arietta G25 microcontroller with a custom sensor software library is used to access and control a three-axis MEMS accelerometer. The position of the dial is marked on the dial-face, and the transformer is set to "manual" mode so that it does not change taps during the configuration process. The set-screw on the dial is loosened so that it can be freely moved without requiring the transformer to actually changes taps. The accelerometer is permanently attached to the dial, which is held manually in the "Neutral" (or 12 o'clock, if the dial-face does not have "Neutral" at 12 o'clock) position, and the SSG records the accelerometer reading in this position. The dial is then manually held in place at each position on the dial-face (−16 through 16 is most common) and the accelerometer reading is recorded. The equation discussed above is then used to calculate the angular offset between each position and the saved Neutral position, and these angular offset values are saved for later use. The dial is placed back in the originally marked position and the set-screw is tightened. The transformer is taken out of "manual" mode, and the configuration is complete.

From here, the device operates by constantly comparing the angular offset between the current reading and the saved Neutral position with the list of angular offsets between Neutral and all of the manually saved positions. Whichever saved value from the list is closest to the current reading is determined to be the position that the dial is in. As discussed above, fewer measurements can be taken during configuration of the device. However, by taking more measurement during configuration, the methods is more efficient.

The data exchange takes place between the Sensor Manager subsystem and the DNP3 Manager subsystem. The two primary subsystems utilize a resource provided by the Linux Operating System (OS), hosted on the microcontroller, referred to as a RAM-Disk, along with simple OS file system operations, to perform inter-system communications. This virtual approach has two significant advantages over using the standard OS physical disk access mechanism (in this case an SD Micro flash device utilized by the Arietta microcontroller device).

The first advantage of utilizing a RAM-Disk approach is that data transferred to and from this virtual device is much faster, as compared to that occurring with a standard disk device interface. RAM memory resides within the hardware footprint of the running OS, whereas writing file data to the SD Micro flash device requires special handling by the OS to transfer said data out to this "external" hardware, which in turn increase resource overhead and extended "time of operation" considerations. The second advantage of utilizing a RAM-Disk approach resides with the physical nature of the SD Micro flash device itself. After numerous "write cycles", by the OS, of file data to the SD Micro flash device, over an extended period of time, the flash device will eventually fail due to "burned" areas on the SD Micro flash device.

The communications protocol implemented between the two primary subsystems utilizes a pre-defined signal filename (for each sensor data point being monitored), created by the Sensor Manager, and written to the RAM-Disk as a signaling "flag". The DNP3 Manager is constantly scanning the RAM-Disk for said pre-defined signal filenames, as "flags" to initiate read of associated sensor data files, also residing on same RAM-Disk.

In detail, when the Sensor Manager determines that a sensor instrument has discovered updated sensor data, the Sensor Manager will first update the respective sensor data file, located on the RAM-Disk, with the new data point value. The DNP3 Manager is concurrently looping, and within said loop, scanning for one or more signal filenames. Once the DNP3 Manager has determined that the pre-defined signal filename is present on the RAM-Disk, the DNP3 Manager reads the data point value from the respective sensor data file on the RAM-Disk and save said data point value in its local DNP3 database. The DNP3 Manager then deletes the aforementioned signal filename from the RAM-Disk and returns to its looping paradigm, scanning for the next signal filename creation event on the RAM-Disk. Once a signal filename is again discovered within the scanning loop, by the DNP3 Manager, the same data processing is performed, as described above.

In the prior art, the measurements are only available on the equipment in the field. Instead, in the instant system, once a new sensor data point is discovered by the DNP3 Manager and stored in its local DNP3 database, respective data is then provided, via DNP3 protocol, to the upstream utility company SCADA equipment, providing updated sensor data to the remote power substation. Thus, this system increases the amount of data available at the central location and reduces the number of technicians required in the field.

While the preferred embodiment of the system monitor power utilities, any and all other utilities capable of being assessed via the system are contemplated by this invention.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures and techniques other than those specifically described herein can be applied to the practice of the invention as broadly disclosed herein without resort to undue experimentation. All art-known functional equivalents of methods, devices, device elements, materials, procedures and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

We claim:

1. A method for digitizing and transmitting real-time readings of data from remote utility distribution stations executed by a microcontroller comprising:
   a. remotely displaying real-time utility data from power distribution equipment;
   b. digitizing the utility data;
   c. synthesizing the utility data;
   d. transmitting the utility data over a secure supervisory control and data acquisition network as to an operations control center; and
   e. reducing field manpower resource required to monitor the critical operational utility data.

2. The method of claim 1 wherein said utility data is synthesized by comparing a three-dimensional vector obtained by the power distribution equipment to a baseline measurement using a custom formula.

3. The method of claim 1 wherein the utility data is transmitted via software capable of communicating to externally connected power utility company secure supervisory control and data acquisition network hardware.

4. The method of claim 1 wherein said utility is a power utility.

* * * * *